United States Patent [19]
Tanaka

[11] Patent Number: 4,525,004
[45] Date of Patent: Jun. 25, 1985

[54] LID LOCK STRUCTURE

[75] Inventor: Toshie Tanaka, Tokyo, Japan

[73] Assignee: Nifco Inc., Yokohama, Japan

[21] Appl. No.: 465,842

[22] Filed: Feb. 11, 1983

[30] Foreign Application Priority Data

Feb. 19, 1982 [JP] Japan ............... 57-21399[U]

[51] Int. Cl.³ .............................. E05C 1/12
[52] U.S. Cl. .................... 292/171; 70/256;
70/DIG. 33; 292/337; 292/DIG. 25; 292/DIG. 38; 292/DIG. 72
[58] Field of Search ....... 292/171, DIG. 72, DIG. 25, 292/337, DIG. 38, 334; 70/256, DIG. 33

[56] References Cited

U.S. PATENT DOCUMENTS

| 1,006,609 | 10/1911 | Wallingsford | 292/DIG. 72 |
| 1,614,845 | 1/1927 | Mobley | 292/DIG. 72 |
| 2,196,049 | 4/1940 | Andres | 292/DIG. 72 |
| 2,200,346 | 5/1940 | Sepull | 292/171 |
| 2,233,278 | 2/1941 | Aldeen | 292/DIG. 72 |
| 2,333,465 | 11/1943 | Claud-Mantle | 292/DIG. 72 |
| 2,563,317 | 8/1951 | Dix et al. | 292/171 |
| 2,612,397 | 9/1952 | Stutt | 292/171 X |
| 2,734,764 | 2/1956 | Angelo | 292/171 X |
| 2,749,165 | 6/1956 | Coulter | 292/171 |
| 2,946,612 | 7/1960 | Ahlgren | 292/337 |
| 3,190,683 | 6/1965 | Schlage | 292/337 |

FOREIGN PATENT DOCUMENTS 1557849 1/1969 France .............. 292/DIG. 38

Primary Examiner—Robert L. Wolfe
Assistant Examiner—Lloyd A. Gall
Attorney, Agent, or Firm—J. R. Halvorsen; T. W. Buckman

[57] ABSTRACT

Disclosed is a lid lock structure for a hinged lid of a recess which is made in a car body to conceal a fueling port. The lid lock structure includes a latch housing containing a bolt and having a plate spring at its head. The bolt catches a catch leg extending from the back of the hinged lid when closed, whereas the plate spring is yieldingly bent to constantly apply pressure to the lid while it is closed. When the bolt is retracted, the lid is unlatched to snap open. The built-in spring structure facilitates assembly work.

4 Claims, 6 Drawing Figures

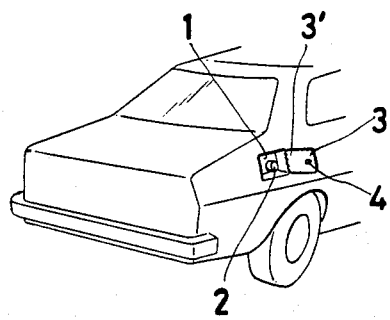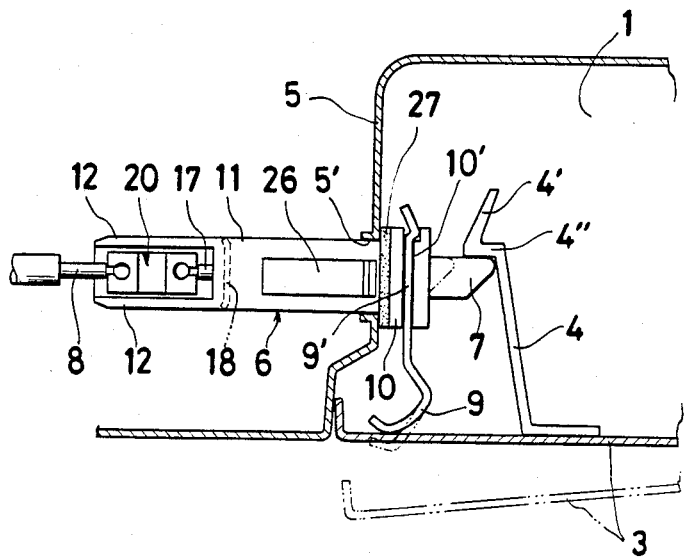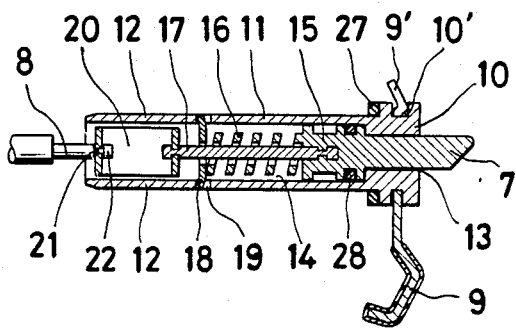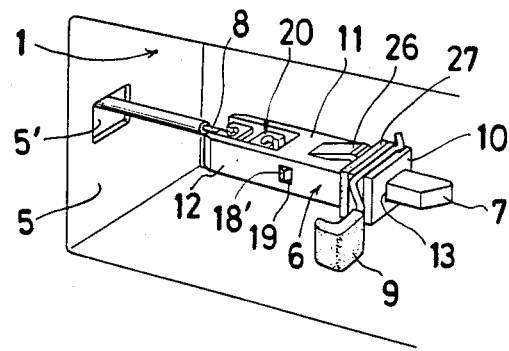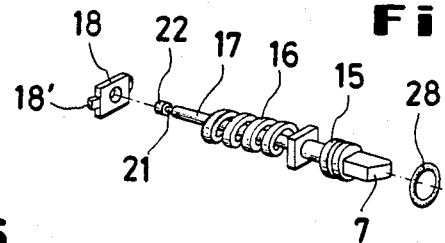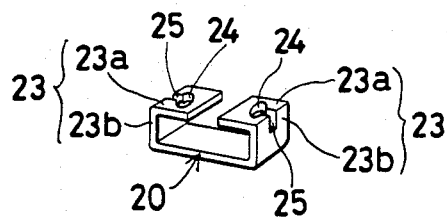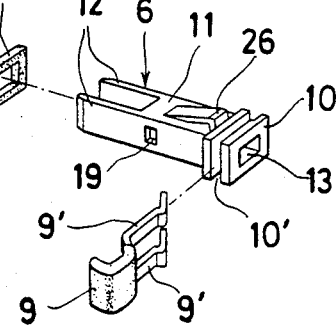

LID LOCK STRUCTURE

BACKGROUND OF THE INVENTION

This invention relates to a lid lock structure, and more particularly to an improvement in a lid lock which permits a person to open a lid of a fueling port within a recess in a car without leaving the driver's seat.

In the past, the fueling port of a car was exposed on the exterior of the car body and the cap of the fueling port was unlocked with the ignition key when the car was to be fueled. However, this entailed the inconvenience of having to unlock the cap, and the exposure of the fueling port to the exterior was both unsightly and dangerous. Recently, car fueling ports are concealed by being mounted within a recess made in the car body and by closing the recess with a hinged lid, which is flush with the surface of the car body when closed. The lid is designed to be unlatched when the driver sitting in his seat pulls a lever which is connected to an appropriate unlatching mechanism via a cable. This lever is provided within easy reach of the driver so that he can unlatch and open the lid without leaving his seat. A spring is provided to a hinge of the lid, and it is resiliently loaded when the lid is closed and latched. Therefore, the lid, when unlatched, snaps open.

This conventional structure requires two separate components, that is, a lid lock which is designed to be controlled remotely for unlatching, and a spring unit for raising and opening the lid. The lid lock must be fixed in a relatively small space with bolts and nuts, and the spring unit must be combined with the hinge of the lid and fixed with bolts, washers etc. This requires tedious work disadvantageous to car assembly on the production line.

SUMMARY OF THE INVENTION

The object of this invention is to provide a lid lock with a built-in spring for a concealed fueling port, thereby eliminating the necessity of equipping a hinge with an associated spring, and accordingly reducing the amount of work which otherwise would be required as is the case with the conventional lid lock structure. Thanks to the integral combination of the lid lock and the spring according to this invention, the efficiency with which mounting work can be performed in car assembly is appreciably improved, and the number of associated parts is substantially reduced.

To attain this object a lid lock structure according to this invention comprises, in combination, a catch leg fixed to the back of a lid and a latch structure fixed to one side wall of a recess which is made in a car body, said latch structure being adapted to catch the catch leg when the lid is closed, and being responsive to a pull given from a remote location for unlatching the lid, and being equipped with a spring, which is yieldingly compressed to store force when the lid is closed by hand.

The latch structure comprises a latch housing to be fixed to one side wall in the recess in a car body, a bolt contained in the latch housing and urged by a spring to partly project from the head of the housing into the recess, and a plate spring fixed to the head of the housing. The latch housing can be easily fixed to one apertured side wall of the recess by a one-way catch or appropriate snap mechanism integrally connected to the surface of the latch housing. When the latch housing is fixed in place, the spring which is used for raising and opening the lid with a snap is simultaneously and automatically fixed in position, requiring no extra work for its mounting. Thus, the work required for mounting the lid on the car body with a hinge is made much less laborious than that which was required in the conventional lid lock structure. As a result the efficiency with which mounting work can be performed has been improved, and the number of associated parts have been reduced.

Other objects and advantages of this invention will be understood from the following description, which is made with reference to accompanying drawings:

BRIEF DESCRIPTION OF THE DRAWINGS

FIG. 1 shows a perspective view of the rear part of a car with a hinged lid open, showing a fueling port inside.

FIG. 2 is a side elevational view of one embodiment according to this invention.

FIG. 3 shows a longitudinal section of a latch structure.

FIG. 4 is a perspective view of a latch structure, showing how it is fixed in one apertured side wall of a recess.

FIG. 5 shows an exploded view of the latch structure.

FIG. 6 shows a perspective view of a connecting piece for use in connecting one end of a cable to the latch structure.

DESCRIPTION OF THE PREFERRED EMBODIMENTS

This invention relates to a latch device which permits the driver of a car to open the lid of a fueling recess without leaving his seat.

FIG. 1 shows the rear part of a car in which a fueling recess is provided. The fueling port 2 is provided in the recess 1. The lid 3 of the recess is hinged at one vertical side 3' to the corresponding vertical side of the recess, and a catch leg 4 is fixed to the other vertical side of the lid on its back surface. The recess 1 has an apertured side wall 5, and a latch housing 6 is inserted in a square aperture 5' and is fixed to the side wall 5 of the recess 1. The latch housing 6 contains a spring 16 and a bolt 7, which is urged by the spring 16 to partly project from the side wall 5 of the recess. When the lid 3 is closed, the ramp end 4' of the catch leg 4 pushes the curved end of the bolt 7 and the bolt yieldingly retracts until the ramp end 4' of the catch leg has gone beyond the end of the bolt, and then the bolt 7 springs back to strike against the upright portion of the catch leg 4. The bolt 7 is caught by the step 4", which connects the ramp 4' to the upright portion of the catch leg 4. Thus, the lid is prevented from opening. As shown, a cable 8 is connected to the bolt 7 via a connecting piece 20 and a connecting rod 17. When the driver operates a lever (not shown) from his seat in the car to pull the cable 8 and hence the bolt 7 against the resilient force of the spring 16, the catch leg 4 of the lid 3 is released from the bolt 7.

A metal or plastic plate spring 9 is fixed to the projecting head 10 of the latch housing 6 so that the free end of the plate spring 9 appears somewhat above the surface of the car body when the lid 3 is open. When the lid 3 is closed, the plate spring 9 is yieldingly bent to store resilient repulsive force in the spring. Thus, an opening force is constantly applied to the lid when it is closed, and when the lid 3 is unlocked by pulling the cable 8 and retracting the bolt 7, the lid 3 snaps open. (See broken lines in FIG. 2). The plate spring 9, which functions to push and open the lid, is built in the latch housing 6. Therefore, it suffices for the latch housing 6 to be fixed in the recess and for the lid 3 to be hinged to the car body. Then, the lid can be opened from the interior. In this particular embodiment the latch housing 6 and the plate spring 9 are made separate from each other. Therefore, a slot 10' is cut around the projecting head 10 of the latch housing 6 for fixing the plate spring 9 thereto. As shown, upper and lower legs 9' of the plate spring 9 are inserted in the slot 10' of the projecting head of the latch housing 6. It should be noted, however, that the latch housing 6 and the plate spring 9 can be integrally molded of plastic.

The lid lock disclosed here is simple in structure, as better understood from the following.

The latch housing 6 is molded of plastic to be rectangular in shape. The head 10 of the housing has the slot 10' therearound, and a somewhat smaller hollow trunk portion 11 extends rearwardly from the head, ending in two opposing legs 12. The head 10 of the latch housing 6 has an aperture for accommodating the tip of the bolt, and the hollow trunk portion 11 of the latch housing has a somewhat larger hollow portion 14 for accommodating the rear portion of the bolt 7.

A coil spring 16 is provided behind the rear portion 15 of the bolt. The bolt and the spring are molded of plastic as one body, and in molding a metal connecting rod 17 is partly inserted into the rear portion of the bolt 7, and the spring 16 encircles the remaining length of the rod 17.

In assembly, first, the bolt 7 is pushed in the latch housing until the head of the bolt 7 appears at the head 10 of the latch housing 6, and then the rod 17 is inserted in the center aperture of a retainer plate 18. The retainer plate 18 is pushed in the latch housing to compress the spring 16 somewhat until the retainer plate is caught with its opposite projections 18' snapped in square apertures 19 in opposite sides of the latch housing 6. Thus, the spring 16 pushes the bolt 7 against the rear face of the head 10 of the latch housing 6, thus causing the bolt 7 to project as long a distance as required from the front face of the head of the latch housing. The retainer plate 18 is made of metal or plastic. The rear portion of the latch housing 6 is made in the form of opposite parallel legs 12. Thanks to this configuration, the retainer plate 18 can be easily pushed in the latch housing until its projections snap in the square apertures on the sides of the latch housing. As is understood from the above, only three components, that is, latch housing 6, bolt 7 and retainer plate 18 are all that are required for the latch assembly.

A connecting piece 20 is used to connect the cable 8 and the rod 17 of the assembly. The free end of the rod 17 is slotted therearound to provide a neck 21 and a head portion 22. Likewise, the free end of the cable 8 is slotted to provide similar neck 21 and head portion 22. As best shown in FIG. 6, the connecting piece 20 consists of a web and two lateral inverted "L"-shaped portions 23 integrally connected to the opposite ends of the web. The flat projection 23a of each inverted "L"-shaped portion 23 has an aperture 24 large enough to accommodate the head 22 of the rod 17, and the upright 23b of the inverted "L"-shaped portion 23 has a slit 25 extending from the aperture 24 of the flat projection 23a. The slit 25 is wide enough to accommodate the neck 21 of the rod 17. With this arrangement the head 22 of the rod 17 is pushed in the aperture 24 of the flat projection 23a, and then the rod 17 is tilted 90 degrees to put the neck 21 thereof in the slit 25 of the upright 23b of the inverted "L"-shaped portion. Then, the rod 17 is connected to the connecting piece 20 with its head caught by the slit of the upright of the inverted "L"-shaped portion.

Two raised catches 26 are integrally connected to the upper and lower surfaces of the latch housing 6 for securing the latch housing in the aperture 5' of one side wall of the recess. As shown, each raised catch is made in the form of a ramp sloping rearwardly as viewed from the front of the latch housing, and the catch is set back from the head of the latch housing 6 by a distance corresponding to the thickness of the apertured side wall of the recess.

When mounting the latch assembly in the recess, the latch housing is put in the recess, and the free end of the cable extending from the driver's seat is connected to the joint piece in the same way as described above for the fixing of the rod to the joint piece. Then, the latch housing is pushed in the aperture 5' of the side wall so that the opposite edges of the aperture climb the rising slope of the catches to fall in between the front of the catches and the back side of the head of the latch housing. Generally, the side wall of the recess is relatively thin. Therefore, the aperture 5' is made by burring to produce a burr therearound as shown in FIG. 2, and then the spacing between the catches 26 and the back surface of the head 10 of the latch housing 6 is set equal to the projection of the burr.

After fixing the latch assembly in the recess, a person at the driver's seat in the car pulls the cable 8, and cuts the cable to an appropriate length. A lever is fixed to the end of the so adjusted length of cable. Then, the bolt 7 will be retracted to clear the recess when the cable is pulled by its lever.

A packing 27 is put around the trunk portion of the latch housing 6, and is pushed against the rear surface of the head 10 of the latch housing before the latch housing is put in the aperture 5' of the side wall of the recess. When the head of the latch housing is pushed against the apertured side wall, the packing 27 is put in between the circumference of the aperture 5' and the rear surface of the head of the latch housing, thereby providing a leak-tight seal around the aperture 5' of the side wall of the recess. An "O"-ring 28 is fitted in a slot around the rear portion 15 of the bolt 7, thereby providing a leak-tight seal between the bolt and the latch housing.

As is understood from the above, a latch assembly according to this invention has resilient means for applying a spring loaded force from the interior to the lid when the lid is unlatched. The built-in spring structure facilitates the assembling of parts in a car. Finally, it should be understood that the latch structure according to this invention is equally applicable to any hinged lid which is designed to be open from the interior.

What is claimed is:

1. A lid lock structure for a hinged lid in combination with an outwardly opening walled recess in a car body including a catch leg having a ramp and step portion at its free end forming a shoulder facing in spaced relation to and fixed to the back of the hinged lid, and a latch assembly, which comprises: a hollow housing fixed at its head to one apertured side wall of the recess; a bolt having a cam end contained in the hollow housing and integrally spring-loaded to partly project said cam end from the front surface of the housing into the recess, thus catching the shoulder portion of the catch leg when the lid is closed; and a plate spring connected to the head of the housing, yieldingly bent to constantly apply pressure against the lid when the lid is closed, whereby the lid is snapped opened from the interior when unlatched by retracting the spring bolt from engagement with said shoulder portion of said catch leg.

2. A lid lock structure according to claim 1 wherein said housing has resilient leg means on its opposite sides at positions spaced from the rear surface of the head by a distance substantially equal to the thickness of said side wall.

3. A lid lock structure according to claim 1 wherein the rear end of said bolt is connected to a cable via a connecting piece, whereby the bolt can be controlled from a distance.

4. A lid lock structure according to claim 1 wherein said plate spring is inserted in a slot around said head of said housing.

* * * * *